(12) United States Patent
Funada et al.

(10) Patent No.: US 9,476,489 B2
(45) Date of Patent: Oct. 25, 2016

(54) ELECTRIC LINEAR ACTUATOR

(71) Applicant: NTN Corporation, Osaka-shi (JP)

(72) Inventors: Kensuke Funada, Iwata (JP);
Yoshinori Ikeda, Iwata (JP); Keisuke Kazuno, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 14/698,026

(22) Filed: Apr. 28, 2015

(65) Prior Publication Data

US 2015/0345602 A1 Dec. 3, 2015

Related U.S. Application Data

(63) Continuation of application No. PCT/JP2013/079376, filed on Oct. 30, 2013.

(30) Foreign Application Priority Data

Oct. 30, 2012 (JP) ................................. 2012-239631

(51) Int. Cl.
*F16H 3/06* (2006.01)
*F16H 27/02* (2006.01)
*F16H 29/02* (2006.01)
*F16H 29/20* (2006.01)
*F16H 25/22* (2006.01)
*F16H 25/20* (2006.01)

(52) U.S. Cl.
CPC ..... *F16H 25/2204* (2013.01); *F16H 2025/204* (2013.01); *F16H 2025/2031* (2013.01); *F16H 2025/2081* (2013.01); *Y10T 74/18576* (2015.01)

(58) Field of Classification Search
CPC ..................... F16H 2025/204; F16H 25/2472; F16H 25/20; F16H 25/2204; F16H 25/2209; F16H 25/2003; F16H 2025/2481
See application file for complete search history.

(56) References Cited

U.S. PATENT DOCUMENTS 2,487,802 A * 11/1949 Heimann ................ F16B 21/18
384/425
3,727,472 A * 4/1973 Maekawa ........... F16H 25/2015
74/89.35

(Continued)

FOREIGN PATENT DOCUMENTS

JP 03-43156 4/1991
JP 2006-233997 9/2006

(Continued)

*Primary Examiner* — William Kelleher
*Assistant Examiner* — Jake Cook
(74) *Attorney, Agent, or Firm* — Harness, Dickey & Pierce, P.L.C.

(57) ABSTRACT

An electric linear actuator has a housing, an electric motor mounted on the housing, a speed reduction mechanism, and a ball screw mechanism. The ball screw mechanism has a nut and screw shaft. Both have helical screw grooves. The screw shaft is inserted into the nut, via a large number of balls. A sleeve is secured on the housing to prevent rotation of the screw shaft relative to the housing. At least one axially extending recessed groove is formed on the inner circumference of the sleeve. At least one guide pin, mounted on the end of the screw shaft, engages the recessed groove. A tapering chamfered portion is formed on the end of the nut.

4 Claims, 9 Drawing Sheets

(56) References Cited

U.S. PATENT DOCUMENTS

| | | | |
|---|---|---|---|
| 3,857,547 A * | 12/1974 | Profet | F16H 25/2006 254/103 |
| 5,094,118 A | 3/1992 | Morita | |
| 5,501,118 A * | 3/1996 | Benton | F16H 25/2209 470/2 |
| 5,511,439 A * | 4/1996 | Las Navas Garcia | F16H 25/20 254/98 |
| 2002/0043880 A1 * | 4/2002 | Suzuki | H02K 7/06 310/12.14 |
| 2012/0247240 A1 | 10/2012 | Kawahara et al. | |

FOREIGN PATENT DOCUMENTS

| | | |
|---|---|---|
| JP | 2010-270887 | 12/2010 |
| JP | 2011-117513 | 6/2011 |
| JP | 2012-082921 | 4/2012 |
| WO | WO2011/135849 | 11/2011 |

\* cited by examiner

PRIOR ART

ELECTRIC LINEAR ACTUATOR

CROSS-REFERENCE TO RELATED APPLICATIONS

This application is a continuation of International Application No. PCT/JP2013/079376, filed Oct. 30, 2013, which claims priority to Japanese Application No. 2012-239631, filed Oct. 30, 2012. The disclosures of the above applications are incorporating herein by reference.

FIELD

The present disclosure relates to an electric linear actuator, with a ball screw mechanism, used in motors in general industries and driving sections of automobiles etc. More particularly, it relates to an electric linear actuator used in a transmission or a parking brake of automobiles to convert rotary motion from an electric motor to linear motion of a driving shaft, via the ball screw mechanism.

BACKGROUND

Generally, gear mechanisms such as a trapezoidal thread worm gear mechanism or a rack and pinion gear mechanism are used as a mechanism to convert rotary motion of an electric motor to axial linear motion in an electric linear actuator in various types of driving sections. These motion converting mechanisms involve sliding contact portions. Thus, power loss is increased. Accordingly, the size of electric motor and power consumption are increased. Thus, ball screw mechanisms have been widely adopted as more efficient actuators.

In prior art electric linear actuators, an output member, connected to a nut, can be axially displaced by rotationally driving a ball screw shaft, forming a ball screw, with the use of an electric motor supported on a housing. Usually, friction of the ball screw mechanism is very low. Thus, the ball screw shaft tends to be easily reversely rotated by a pushing thrust load applied to the output member. Accordingly, it is necessary to hold the position of the output member when the electric motor is stopped.

Figure 11:
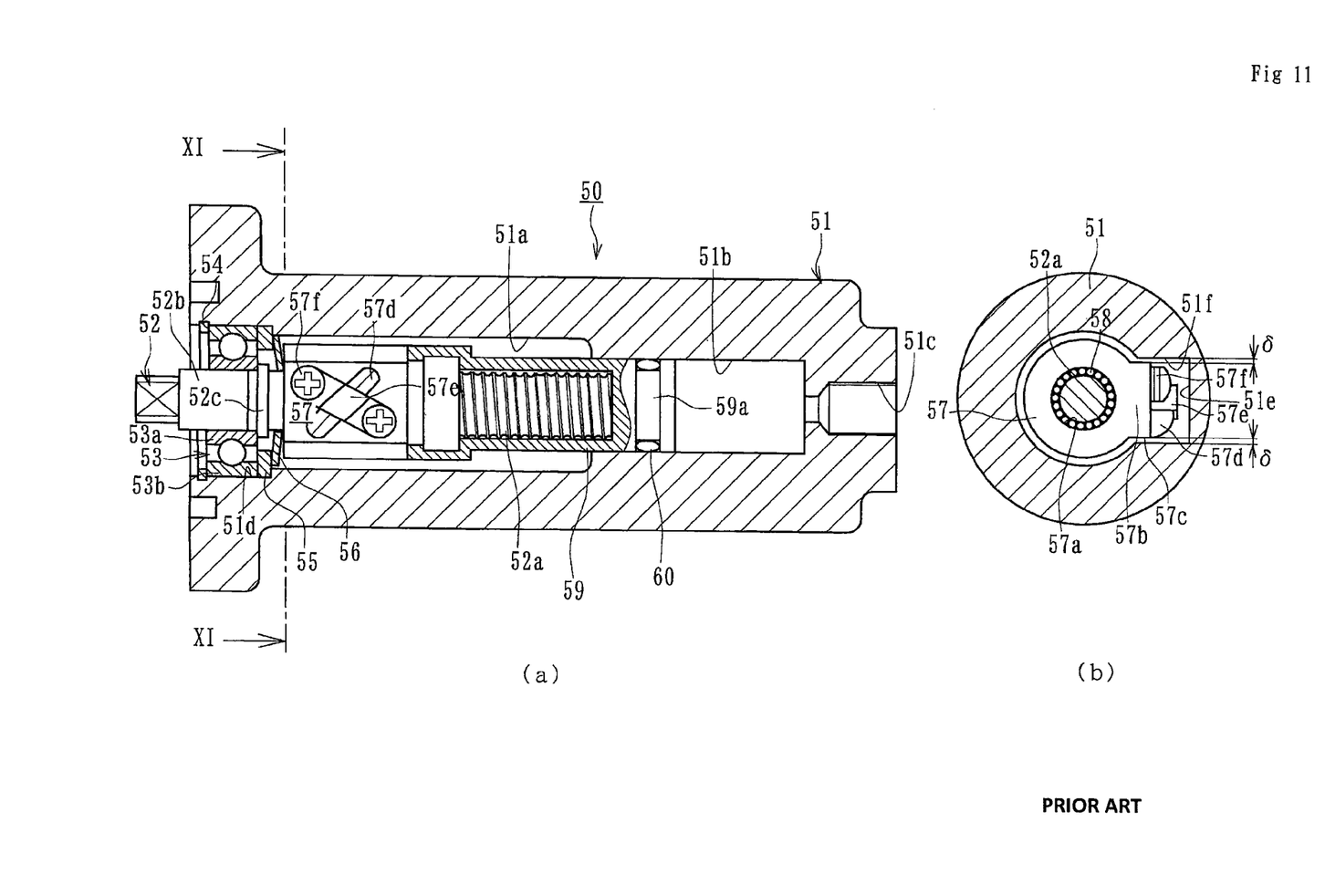
FIG. 11 is a longitudinal section view of a prior art electric linear actuator.

An electric linear actuator has been developed with a brake for the electric motor or a low efficient mechanism, such as a worm gear is provided as a power transmitting mechanism. One representative example of the electric linear actuator is shown in FIG. 11. Here, the electric linear actuator 50 has a cylindrical housing 51 with a cavity 51a to contain a ball screw mechanism. A cylinder portion 51b is arranged coaxially with the cavity 51a. A fluid inlet (not shown) and fluid outlet 51c communicate with the cylinder portion 51b.

A screw shaft 52 extends into the cavity 51a of the housing 51. One end of the screw shaft 52 is connected to an electric motor (not shown) arranged outside of the housing 51. The outer circumference of the screw shaft 52 includes a male-screw groove 52a, a round shaft portion 52b and flange portion 52c, therebetween. An inner ring 53a of a bearing 53 is fit on the round shaft portion 52b. The inner end face (the right end face in FIG. 11) of the inner ring 53a abuts against the flange portion 52c. An outer end face (the left end face) of an outer ring 53b of the bearing 53 abuts against a stopper ring 54 fit in the cavity 51a. Accordingly, the screw shaft 52 is rotationally supported by the bearing 53, but is axially immovable. In addition, a washer 55 and a leaf spring (shock absorbing member) 56 are disposed between the inner end face of the outer ring 53b of the bearing 53 and a stepped portion 51d of the housing 51.

A cylindrical nut 57, only axially movable relative to the housing 51, is disposed around the screw shaft 52. It includes a female-screw groove 57a on its inner circumference. A plurality of balls 58 are rollably disposed within a helical rolling passage formed between the male and female screw grooves 52a, 57a. The ball screw mechanism is thus formed by the screw shaft 52, the nut 57 and the balls 58.

A radially projecting portion 57b, with a rectangular cross-section, is integrally formed with the outer circumference of the nut 57. The radially projecting portion 57b engages an axially extending guide groove 51e formed on the inner circumference of the cavity 51a of the housing 51. A predetermined gap "δ" is formed in each space between the side surfaces (engaging surfaces) 57c, 57c and the side surfaces (guide surfaces) 51f, 51f of the guide groove 51e.

A tube 57d, forming a ball-circulating member, is mounted on a flat outermost surface of the radially projecting portion 57b. The tube 57d is secured on the nut 57 by screws 57f via a bracket 57e. The tube 57d returns the balls 58 from one end to the other end of the helical rolling passage formed between the screw grooves 52a, 57a.

A hollow cylindrical piston member 59, having one closed end, is mounted on the right end of the nut 57. The screw shaft 52 can enter into and come out from a space within the piston member 59. The outer circumference of the piston member 59 is closely and slidably fit into the inner circumference of the cylinder portion 51b of the housing 51. An O-ring 60 is disposed in a circumferential groove 59a formed near the right end of the piston member 59. The O-ring 60 prevents fluid filled within the cylinder portion 51b from leaking toward the cavity 51a through a gap between the piston member 59 and the cylinder portion 51b (see e.g. JP 2006-233997 A).

In the prior art electric linear actuator 50, the anti-rotation of the nut 57 is performed by engagement of the guide groove 51e, formed on the housing 51, with the radially projecting portion 57b, integrally formed on the nut 57. However, the integral structure of the radially projecting portion 57b with the nut 57 increases manufacturing cost of the electric linear actuator 50. In addition, the housing 51 is formed of aluminum alloy to reduce the weight of the electric actuator 50. However, the housing 51, formed of aluminum alloy, would be short in wear resistance and strength for the engagement of the guide groove 51e of the housing 51 with the radially projected portion 57a. Also, it is believed that the housing 51 would be deformed or destroyed by an impact force of the ball screw applied against the inner wall of the housing 51 if the electric linear actuator 50 could not be correctly controlled due to system error etc.

SUMMARY

It is an object of the present disclosure to provide an electric linear actuator that reduces damage and wear on the housing and performs anti-rotation of the nut with a simple structure. This improves the reliability and manufacturing cost of the electric linear actuator.

According to the present disclosure, an electric linear actuator comprises a housing, an electric motor mounted on the housing, a speed reduction mechanism, and a ball screw mechanism. The speed reduction mechanism reduces rotational speed of the electric motor, via a motor shaft. The ball screw mechanism converts rotational motion of the electric motor, transmitted via the speed reduction mechanism, to axial linear motion of a drive shaft. The ball screw mechanism includes a nut and a screw shaft. The nut includes a helical screw groove on its inner circumference. The nut is rotationally supported by bearings mounted on the housing, but is axially immovable. The screw shaft is coaxially integrated with the drive shaft. The screw shaft includes a helical screw groove on its outer circumference corresponding to the helical screw groove of the nut. The screw shaft is inserted into the nut, via a large number of balls. The screw shaft is axially movably supported on the housing but is non-rotatable with respect to the housing. A sleeve is secured on the housing to prevent rotation of the screw shaft relative to the housing. The sleeve includes at least one axially extending recessed groove on the inner circumference of the sleeve. At least one guide pin is mounted on the end of the screw shaft. The pin engages the recessed groove. A tapering chamfered portion is formed on the end of the nut.

The speed reduction mechanism reduces rotational speed of the electric motor, via a motor shaft. The ball screw mechanism converts rotational motion of the electric motor, transmitted via the speed reduction mechanism, to axial linear motion of a drive shaft. The ball screw mechanism includes a nut and a screw shaft. The nut includes a helical screw groove on its inner circumference. The nut is rotationally supported by bearings mounted on the housing. The nut is axially immovable with respect to the housing. The screw shaft is coaxially integrated with the drive shaft. The screw shaft includes a helical screw groove on its outer circumference corresponding to the helical screw groove of the nut. The screw shaft is inserted into the nut, via a large number of balls. The screw shaft is axially movably supported on the housing, but is not rotatable. A sleeve is secured on the housing to prevent rotation of the screw shaft relative to the housing. The sleeve includes at least one axially extending recessed groove on the inner circumference of the sleeve. At least one guide pin is mounted on the end of the screw shaft. The pin engages the recessed groove. A tapering chamfered portion is formed on the end of the nut. Thus, it is possible to provide an electric linear actuator that brings the nut and the sleeve close to each other while avoiding interference. Thus, this prevents falling-out of the guide pin(s) from the recessed groove to reduce damage and wear on the housing. Also, this improves the reliability of the electric linear actuator while preventing rotation of the screw shaft by a simple structure. It satisfies both the reduction of weight and the increase of the durability and strength of the electric linear actuator.

A distance between the nut and the sleeve is smaller than the radius of the guide pin. This prevents falling-out of the guide pin(s) from the recessed groove.

Figure 5:
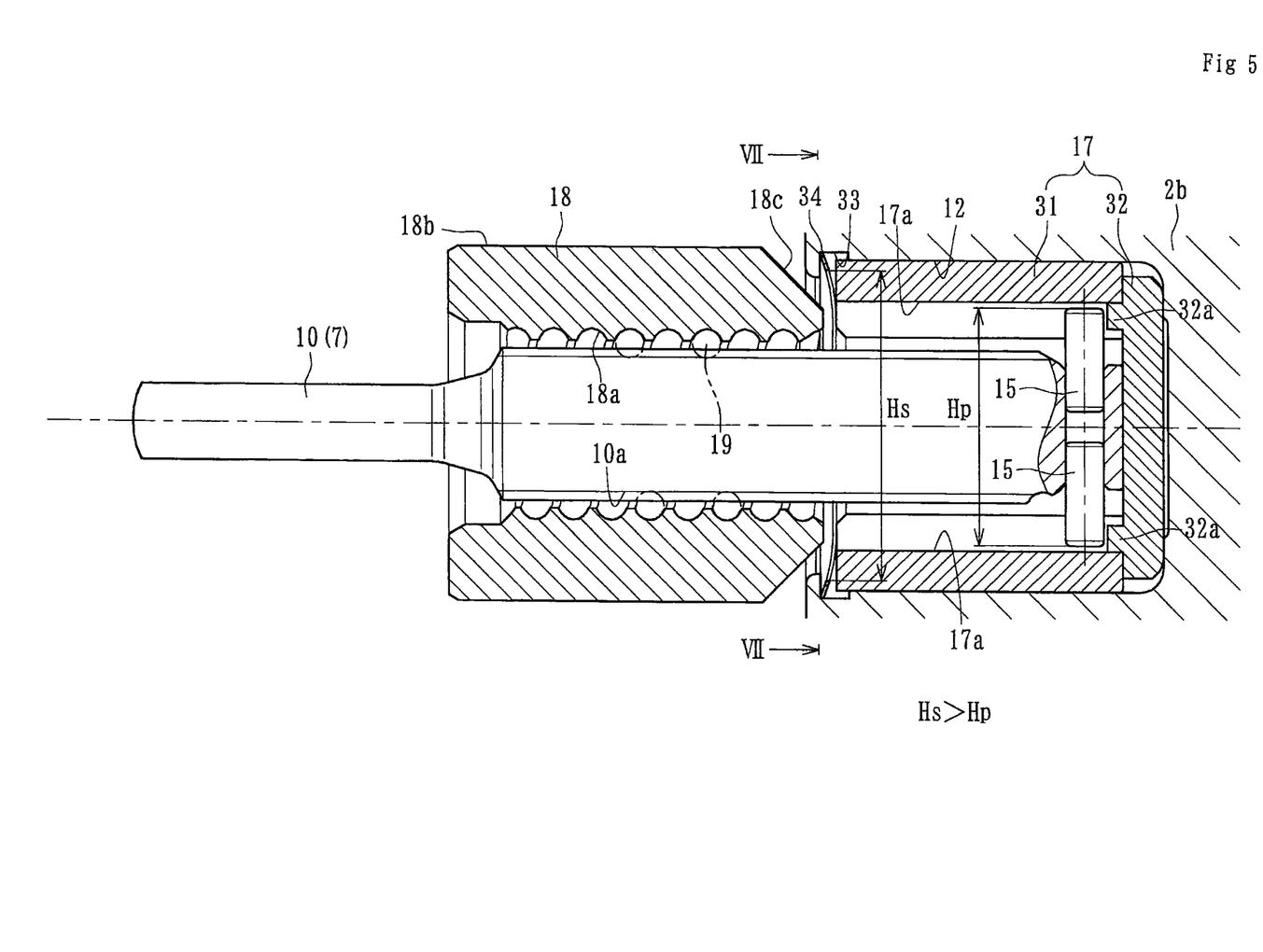
FIG. 5 is an enlarged cross-sectional view of FIG. 1.

The housing includes an annular groove. A stopper ring is mounted in the annular groove to prevent falling-out of the sleeve from the housing. The inner diameter of the stopper ring is larger than the whole height of the guide pin. This enables the guide pin(s) to abut against the end face of the nut without interfering with the stopper ring when the screw shaft is moved toward the left (FIG. 5). Thus, this prevents falling-out of the stopper ring and accurately controls the moving range of the screw shaft. In addition, the contact surface, between the stopper ring and the sleeve, is circular. Thus, it is possible to maintain uniform urging force applied to the sleeve by the stopper ring and to stably hold the sleeve without any axial play.

The outer diameter of the chamfered portion at its end is smaller than the inner diameter of the stopper ring. This prevents falling-out of the guide pin(s) while avoiding interference of the nut with the stopper ring.

Finally, corners of the stopper ring are rounded to remove sharp edges. This prevents the generation of abrasion debris.

The electric linear actuator of the present disclosure comprises a housing, an electric motor mounted on the housing, a speed reduction mechanism and a ball screw mechanism. The speed reduction mechanism reduces rotational speed of the electric motor, via a motor shaft. The ball screw mechanism converts rotational motion of the electric motor, transmitted via the speed reduction mechanism, to axial linear motion of a drive shaft. The ball screw mechanism includes a nut and a screw shaft. The nut includes a helical screw groove on its inner circumference. The nut is rotationally supported by bearings mounted on the housing, but is axially immovable. The screw is coaxially integrated with the drive shaft. The screw shaft includes a helical screw groove on its outer circumference corresponding to the helical screw groove of the nut. The screw shaft is inserted into the nut, via a large number of balls. The screw shaft is axially movably supported on the housing. The screw shaft is non-rotatable with respect to the housing. A sleeve is secured on the housing to prevent rotation of the screw shaft relative to the housing. The sleeve includes at least one axially extending recessed groove on the inner circumference of the sleeve. At least one guide pin is mounted on the end of the screw shaft to engage the recessed groove. A tapering chamfered portion is formed on the end of the nut. Thus, it is possible to provide the electric linear actuator with the nut and the sleeve close to each other while avoiding interference. Thus, this prevents prevent falling-out of the guide pin(s) from the recessed groove to reduce damage and wear on the housing. Also, this improves the reliability of the electric linear actuator while preventing rotation of the screw shaft by a simple structure. This satisfies both the reduction of weight and the increase in durability and strength of the electric linear actuator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9($a$) is a front elevation view of the sleeve of FIG. 1.

FIG. 9($b$) is a cross-sectional view taken along a line IX-IX of FIG. 9($a$).

FIG. 9(c) is a rear elevation view of the sleeve of FIG. 9(b).

DETAILED DESCRIPTION

One mode for carrying out the present disclosure is an electric linear actuator comprising a housing formed of aluminum alloy. An electric motor is mounted on the housing. A speed reduction mechanism reduces rotational speed of the electric motor, via a motor shaft. A ball screw mechanism converts rotational motion of the electric motor, transmitted via the speed reduction mechanism, to axial linear motion of a drive shaft. The ball screw mechanism includes a nut and a screw shaft. The nut includes a helical screw groove on its inner circumference. The nut is rotationally supported by bearings mounted on the housing. The nut is axially immovable with respect to the housing. The screw shaft is coaxially integrated with the drive shaft. The screw shaft includes a helical screw groove on its outer circumference corresponding to the helical screw groove of the nut. The screw shaft is inserted into the nut, via a large number of balls. The screw shaft is axially movably supported on the housing, but is not rotatable. A blind bore is formed on the housing to contain an end of the screw shaft. A sleeve, formed of sintered alloy, is fit into the blind bore formed in the housing until the sleeve is in close contact with a bottom of the blind bore. A pair of axially extending recessed grooves is formed on the inner circumference of the sleeve at diametrically opposed positions. A guide pin(s), mounted on the end of the screw shaft, engages the recessed groove. A tapering chamfered portion is formed on the end of the nut. The outer diameter of the chamfered portion, at the end of the nut, is smaller than a distance between the recessed grooves.

A preferred embodiment and modifications of the present disclosure will be hereinafter described with reference to the drawings.

Figure 1:
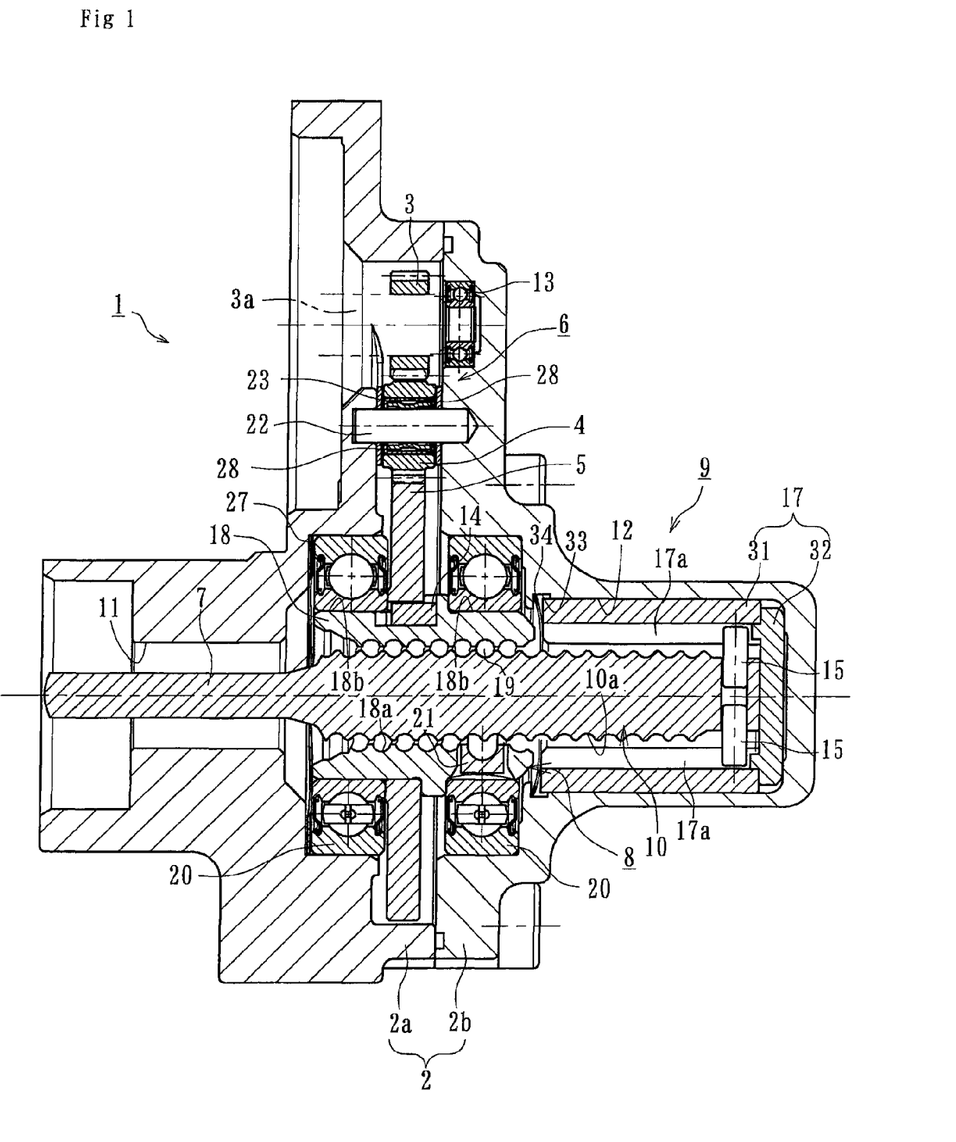
FIG. 1 is a longitudinal section view of a preferable embodiment of an electric linear actuator.
Figure 2:
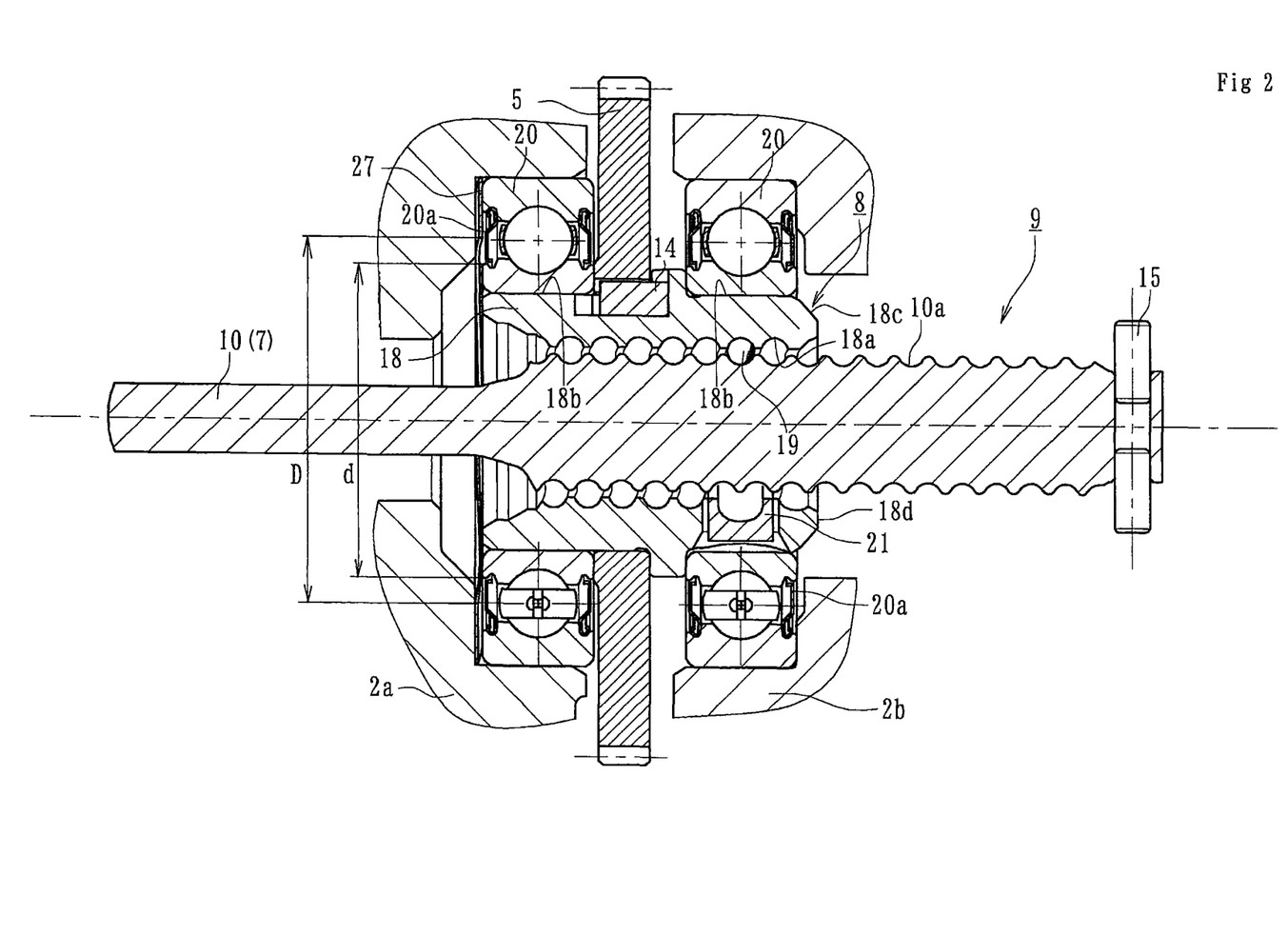
FIG. 2 is a longitudinal section view of an actuator main body of FIG. 1.
Figure 3:
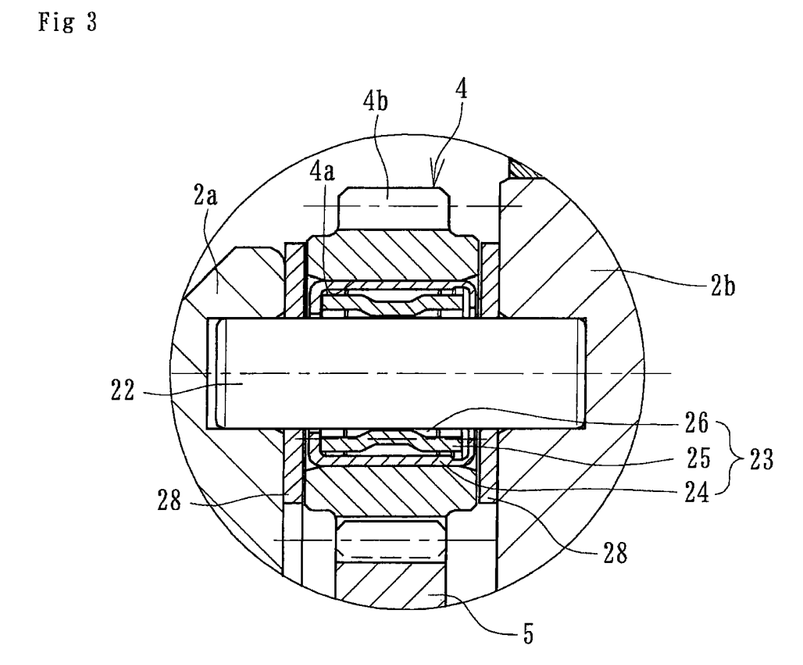
FIG. 3 is a partially enlarged cross-sectional view of an intermediate gear portion of FIG. 1.
Figure 4:
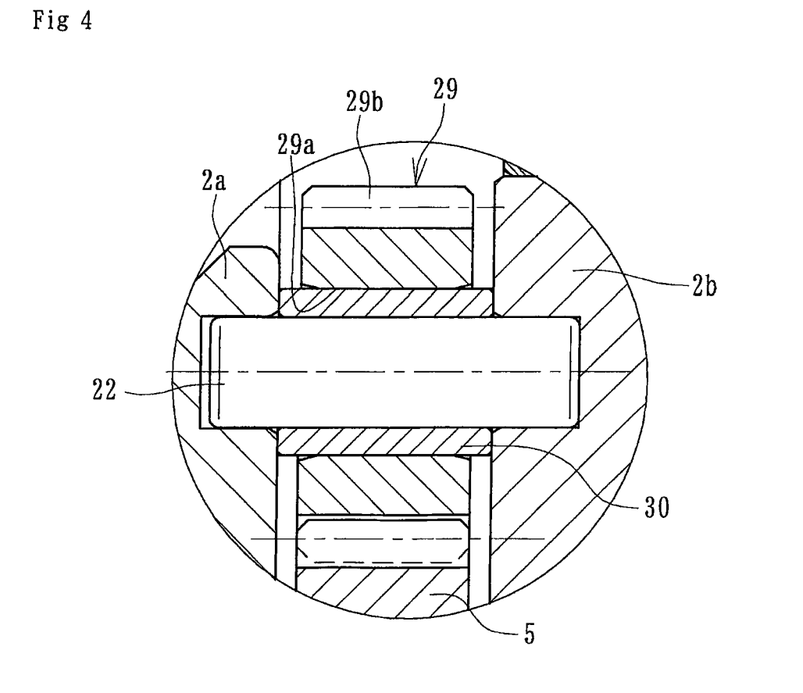
FIG. 4 is a partially enlarged cross-sectional view of a modification of the intermediate gear portion of FIG. 3.
Figure 6:
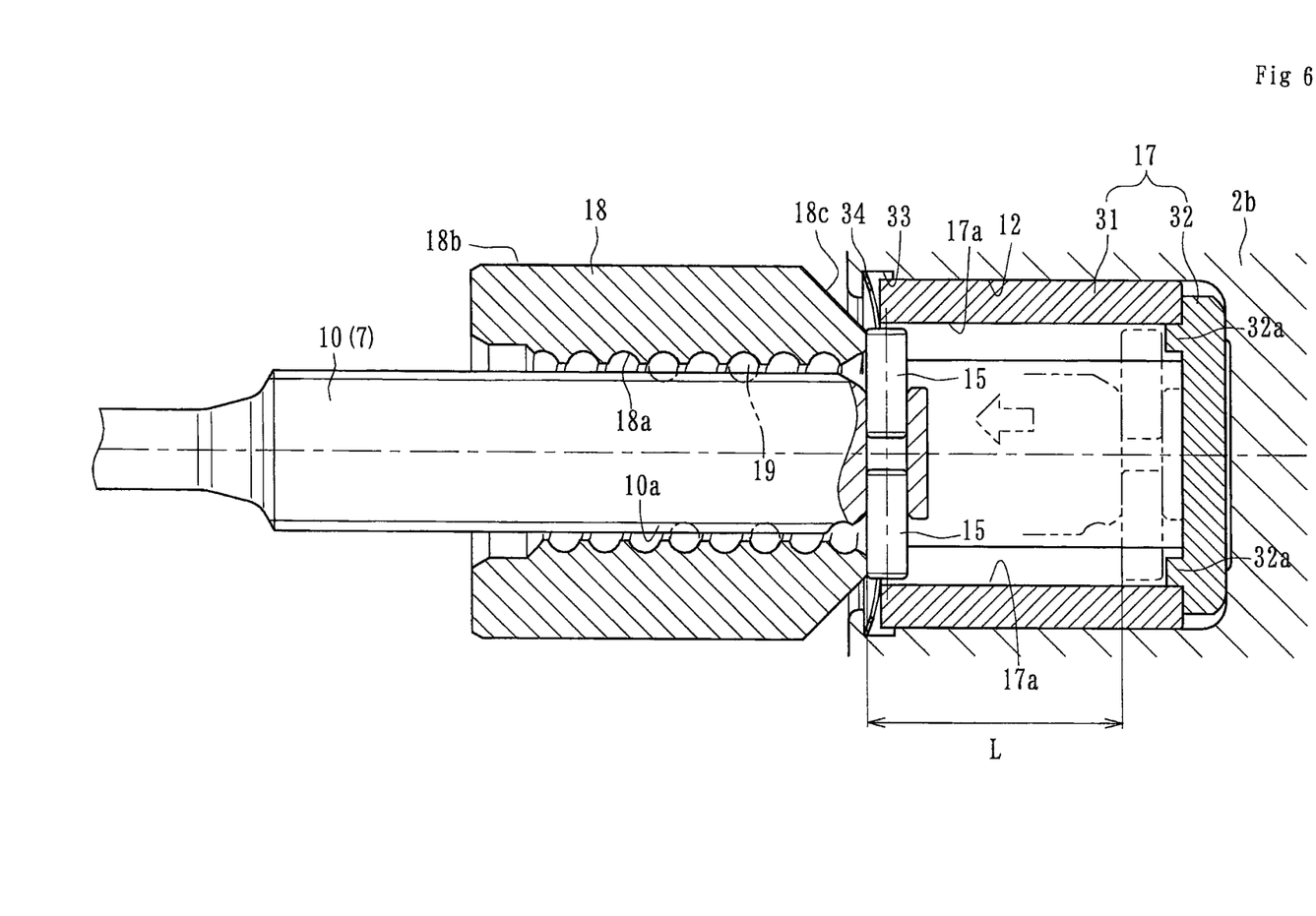
FIG. 6 is an explanatory view of a moving range of the screw shaft.
Figure 7:
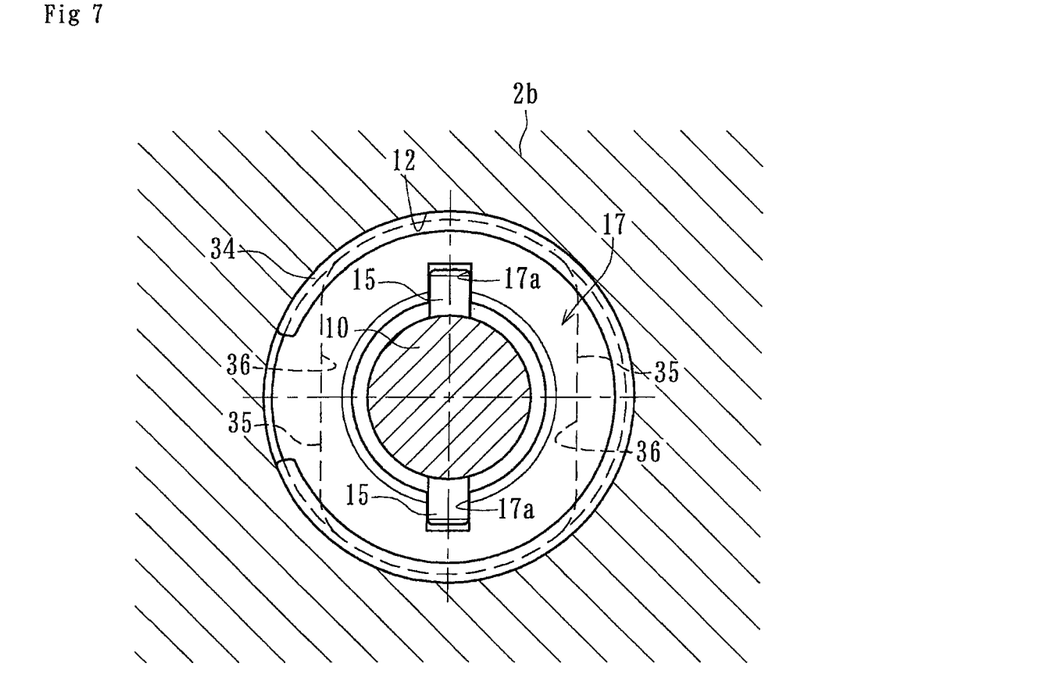
FIG. 7 is a cross-sectional view taken along a line VII-VII of FIG. 5.
Figure 8:
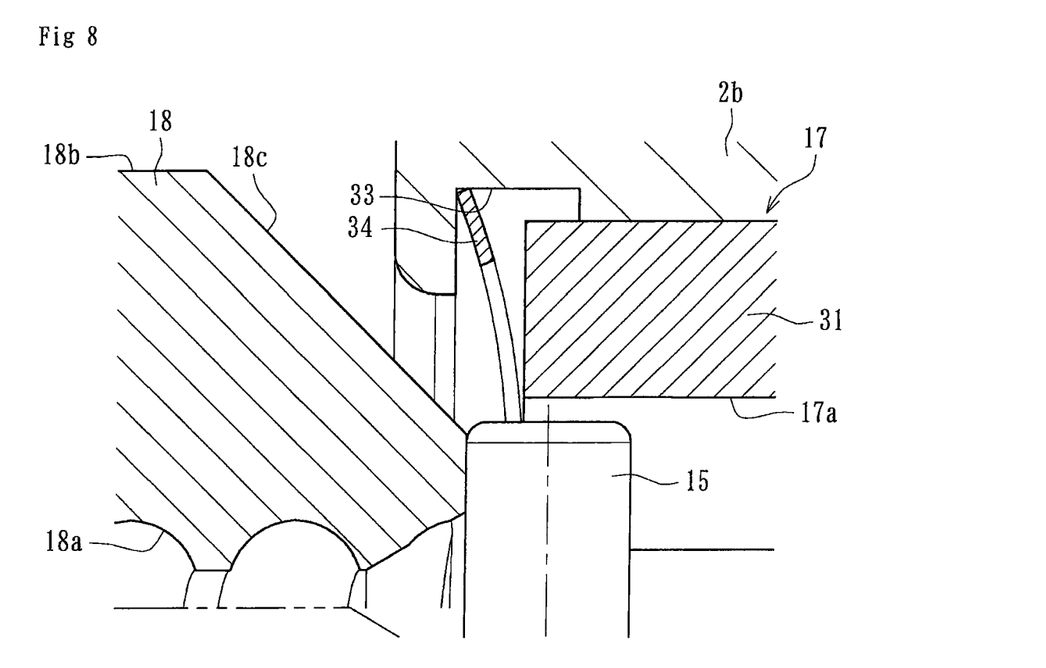
FIG. 8 is a partially enlarged view of FIG. 6.
Figures 9A, 9B, 9C:
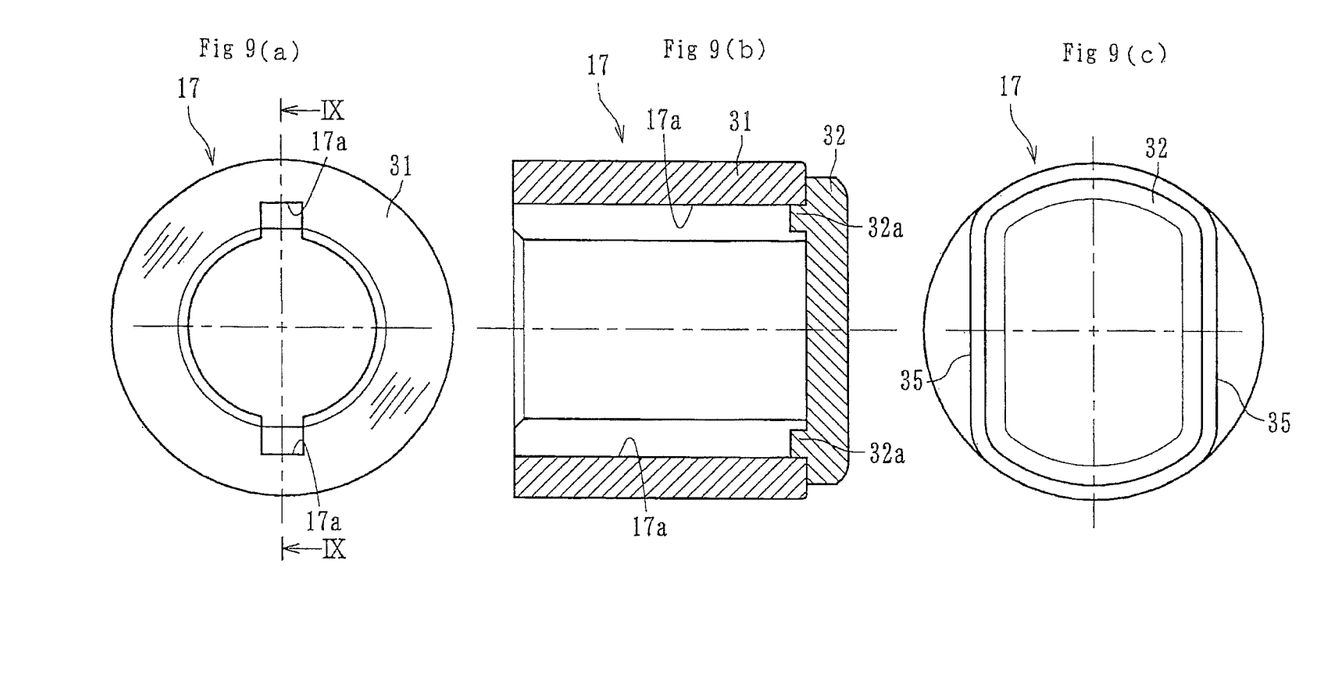
Figure 10A:
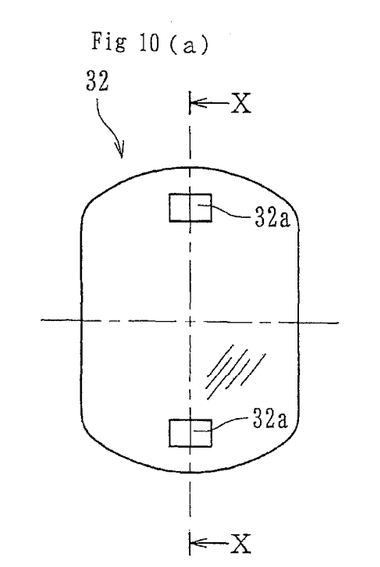
FIG. 10(a) is a front elevation view of a bottom plate of the sleeve of FIG. 9.
Figure 10B:
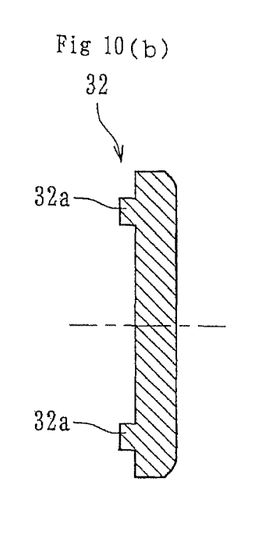
FIG. 10(b) is a cross-sectional view taken along a line X-X of FIG. 10(a).
Figure 10C:
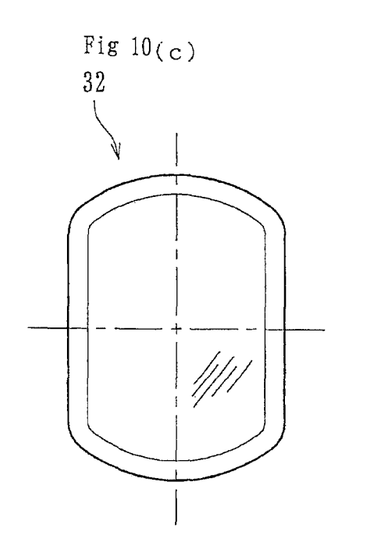
FIG. 10(c) is a rear elevation view of the bottom plate of the sleeve of FIG. 9.

FIG. 1 is a longitudinal section view of a preferable embodiment of an electric linear actuator. FIG. 2 is a longitudinal section view of an actuator main body of FIG. 1. FIG. 3 is a partially enlarged cross-sectional view of an intermediate gear portion of FIG. 1. FIG. 4 is a partially enlarged cross-sectional view of a modification of the intermediate gear portion of FIG. 3. FIG. 5 is an enlarged cross-sectional view of FIG. 1. FIG. 6 is an explanatory view of a moving range of the screw shaft. FIG. 7 is a cross-sectional view taken along a line VII-VII of FIG. 5. FIG. 8 is a partially enlarged view of FIG. 6. FIG. 9(a) is a front elevation view of the sleeve of FIG. 1. FIG. 9(b) is a cross-sectional view taken along a line IX-IX of FIG. 9(a). FIG. 9(c) is a rear elevation view of the sleeve of FIG. 9(b). FIG. 10(a) is a front elevation view of a bottom plate of the sleeve of FIG. 9. FIG. 10(b) is a cross-sectional view taken along a line X-X of FIG. 10(a). FIG. 10(c) is a rear elevation view of the bottom plate of the sleeve of FIG. 9.

As shown in FIG. 1, an electric linear actuator 1 includes a cylindrical housing 2, an electric motor (not shown) mounted on the housing 2, an intermediate gear 4, a speed reduction mechanism 6, a ball screw mechanism 8 and an actuator main body 9. The intermediate gear 4 mates with an input gear 3 mounted on the motor shaft 3a of the motor. The speed reduction mechanism 6 includes the input gear 3, the intermediate gear 4 and an output gear 5 mating with the intermediate gear 4. The ball screw mechanism 8 converts rotational motion of the electric motor, transmitted via the speed reduction mechanism 6, to axial linear motion of a drive shaft 7. The actuator main body 9 includes the ball screw mechanism 8.

The housing 2 is formed of aluminum alloy such as A 6063 TE, ADC 12 etc. It is formed by aluminum die casting. The housing 2 includes a first housing 2a and a second housing 2b abutted with and integrally fastened to each other by fastening bolts (not shown). The electric motor is mounted on the first housing 2a. Blind bores 11, 12, to contain a screw shaft 10, are formed in the first and second housings 2a, 2b, respectively.

The input gear 3 is immovably press-fit onto the motor shaft 3a of the electric motor. Both are rotationally supported by a deep groove rolling bearing 13 mounted on the second housing 2b. The output gear 5, mating with the intermediate spur gear 4, is integrally secured, via a key 14, on a nut 18. The nut 18 forms a portion of the ball screw mechanism 8, described later.

The drive shaft 7 is integrally formed with the screw shaft 10, forming a portion of the ball screw mechanism 8. Guide pin(s) 15, 15 are mounted on one end (the right end in FIG. 1) of the drive shaft 7. In addition, a sleeve 17, described later, is fit in the blind bore 12 of the second housing 2b. Axially extending recessed grooves 17a, 17a are formed by grinding on the inner circumference of the sleeve 17. The recessed groves 17a, 17a are arranged at diametrically opposite positions. The pin(s) 15, 15 of the screw shaft 10 engage the recessed groove 17a. Thus, the screw shaft 10 is axially movably supported, but is not rotatable, with respect to the housing. The sleeve 17 includes a cylindrical sleeve main body 31 and a bottom plate 32 fit onto one end of the sleeve main body 31.

As shown in the enlarged view of FIG. 2, the ball screw mechanism 8 includes the screw shaft 10 and the nut 18 mated with the screw shaft 10, via balls 19. The screw shaft 10 includes a helical screw groove 10a on its outer circumference. The nut 18 includes, on its inner circumference, a screw groove 18a corresponding to the screw groove 10a of the screw shaft 10. A plurality of balls 19 is rollably contained between the screw grooves 10a, 18a. The nut 18 is rotationally supported by two supporting bearings 20, 20, but is axially immovable relative to the housings 2a, 2b. A numeral 21 denotes a bridge member to achieve an endless circulating passage of balls 19 through the screw groove 18a of the nut 18.

The cross-sectional configuration of each screw groove 10a, 18a may be either a circular-arc or Gothic-arc configuration. However, this embodiment adopts the Gothic-arc configuration. Thus, it can have a large contacting angle with the ball 19 and a small axial gap. This enables large rigidity against the axial load and suppresses generation of vibration.

The nut 18 is formed of case hardened steel such as SCM 415 or SCM 420. Its surface is hardened to HRC 55~62 by vacuum carburizing hardening. This omits treatments such as buffing for scale removal after heat treatment. Thus, this reduces the manufacturing cost. The screw shaft 10 is formed of medium carbon steel such as S 55C or case hardened steel such as SCM 415 or SCM 420. Its surface is hardened to HRC 55~62 by induction hardening or carburizing hardening.

The output gear 5, forming part of the speed reduction mechanism 6, is firmly secured on the outer circumference 18b of the nut 18, via a key 14. The support bearings 20, 20 are press-fit onto the nut via a predetermined interface at both sides of the output gear 5. This prevents both the supporting bearings 20, 20 and output gear 5 from being axially shifted even though a strong thrust load may be applied to them from the drive shaft 7. Each supporting bearing 20 includes a deep groove ball bearing. Both sides of the bearings 20 include mounted shield plates 20a, 20a to prevent lubricating grease sealed within the bearing body from leaking outside and abrasive debris from entering into the bearing body from outside.

In the illustrated embodiment, both the supporting bearings 20, 20 are formed by deep groove ball bearing with the same specifications. Thus, it is possible to support both a thrust load, applied from the drive shaft 7, and a radial load, applied from the output gear 5. Also, it simplifies assembly by preventing errors during assembly of the bearing. Thus, this improves the assembly by operation. In this case, the term "same specifications" means that the deep groove ball bearings have the same inner diameters, outer diameters, width dimensions, rolling element sizes, rolling element numbers and internal clearances.

In the illustrated embodiment, one of the paired supporting bearings 20, 20 is mounted on the first housing 2a via a ring shaped elastic washer 27. The washer 27 is a wave-washer press-formed of austenitic stainless steel sheet (e.g. SUS 304 family of JIS) or preservative cold rolled steel sheet (e.g. SPCC family of JIS). An inner diameter "D" of the wave washer 27 is formed larger than an outer diameter "d" of the inner ring of the supporting bearing 20. This eliminates axial play of the paired bearings 20, 20. Thus, smooth rotation of the bearings 20 is obtained. In addition, the washer 27 contacts only the outer ring of the bearing 20 and does not contact its rotational inner ring. This prevents the inner ring of the bearing 20 from abutting against the housing 2a. Thus, it is locked by the housing 2a although the nut 18 would be urged by a reverse thrust load toward the housing 2a.

The intermediate gear 4 forming the speed reduction mechanism 6 will be described. As shown in FIG. 3, the intermediate gear 4 is rotationally supported by a gear shaft 22. The gear shaft 22 is mounted on the first and second housings 2a, 2b, via a rolling bearing 23. One end of the gear shaft 22 is press-fit into an aperture on the first housing 2a. Thus, it is designed that the other end of the gear shaft 22 is mounted in an aperture of the second housing 2b, by a clearance fit. Accordingly, assembling misalignment will be allowed and smooth rotational performance of the rolling bearing 23 and the intermediate gear 4 will be obtained. In the illustrated embodiment, the rolling bearing 23 is a so-called "shell type" needle roller bearing. It includes an outer ring 24, press-formed of steel sheet, press-fit into an inner circumference 4a of the intermediate gear 4. A plurality of needle rollers 26 are contained in the outer ring 24, via a cage 25. This needle bearing is readily available and thus reduces manufacturing cost.

Ring shaped washers 28, 28 are installed on both sides of the intermediate gear 4 to prevent direct contact of the intermediate gear 4 against the first and second housings 2a, 2b. In this case, a face width of the teeth 4b of the intermediate gear 4 is formed smaller than an axial width of the gear (blank). This reduces the contact area between the intermediate gear 4 and the washers 28. Thus, their frictional resistance is reduced and smooth rotational performance is obtained. The washers 28 are flat washers press-formed of austenitic stainless steel sheet, having high strength and frictional resistance, or preservative cold rolled steel sheet. Alternatively, the washers 28 may be formed of brass, sintered metal or thermoplastic synthetic resin such as PA (polyamide) 66 etc. A predetermined amount of fiber reinforcing material such as GF (glass fiber) etc. is impregnated into the resin.

In addition, the width of the rolling bearing 23 is set smaller than the width of the intermediate gear 4. This makes it possible to prevent wear or deformation of the sides of the bearing. Thus, smooth rotation is obtained.

FIG. 4 shows a modification of the structure of FIG. 3. The intermediate gear 29 is rotationally supported on the gear shaft 22 mounted on the first and second housings 2a, 2b, via a sliding bearing 30. In this embodiment, the face width of the teeth 29b is formed the same as the axial width of gear 29. The sliding bearing 30 is structured as an oil impregnated bearing ("BEARFIGHT" (registered trade mark of NTN Corporation)). It includes porous metal with graphite micro-powder. The sliding bearing 30 has a larger width than that of the intermediate gear 29 and is press-fit into the inner circumference 29a of the intermediate gear 29. This prevents the intermediate gear 29 from contacting the first and second housings 2a, 2b. This occurs without mounting any washer, to achieve smooth rotational performance while suppressing frictional resistance during rotation of the intermediate gear 29. This reduces the manufacturing cost while reducing the number of components. The sliding bearing 30 may be formed by injection molding a thermoplastic polyimide resin.

According to the present embodiment, the blind bore 12 of the second housing 2b is formed with an annular groove 33 near its opening. A stopper ring 34 is mounted in the groove 33 to prevent axial falling-out of the sleeve 17 from the housing. The stopper ring 34 is press-formed from cold rolled steel sheet and mounted so that it urges the end face of the sleeve 17. Corners of the stopper ring 34 are rounded to remove sharp edges. This prevents the generation of abrasion debris during mounting of the stopper ring 34 into the annular groove 33. This also prevents the generation of axial play. The inner diameter "Hs" of the stopper ring 34 is larger than the entire height "Hp" of the guide pin(s) 15. This makes it possible for the guide pin(s) 15 to abut against the end face of the nut 18 without interfering with the stopper ring 34 when the screw shaft 10(7) is moved toward the left (FIG. 5). Thus, this prevents falling out of the stopper ring 34 and accurately controls the moving range "L" (FIG. 6) of the screw shaft 10. In addition, the contact surface between the stopper ring and the sleeve is circular as shown in FIG. 7. Thus, this maintains a uniform urging force applied to the sleeve 17 by the stopper ring 34. This stably holds the sleeve 17 without any axial play.

In order to prevent the guide pin(s) 15 from falling out from the recessed grooves 17a, 17a, a distance between the nut 18 and sleeve 17 is set so that an outer diameter of a tapering chamfered portion 18c, formed on the end of the nut 18, is smaller than a distance between the recessed grooves 17a, 17a. Especially, it is possible to prevent falling-out of the guide pin(s) 15 from the recessed grooves 17a, 17a by setting the distance between the nut 18 and the sleeve 17 smaller than the radius of the guide pin 15. This makes it possible to arrange the nut 18 close to the sleeve 17 without interfering with the stopper ring 34 and the sleeve 17. Thus, this reduces the size of the electric linear actuator.

The sleeve 17 is formed of sintered alloy by an injection molding machine for molding plastically prepared metallic powder. In the injection molding, metallic powder and binder are used. The binder comprises plastics and wax. They are first mixed and kneaded by a mixing and kneading machine to form pellets from the mixed and kneaded material. The pellets are fed into a hopper of the injection molding machine. The material is pushed into dies under a heated and melted condition and finally is formed into the sleeve by a so-called MIM (Metal Injection Molding) method. The MIM method can easily mold sintered alloy material into articles with desirable accurate configurations and dimensions even though the articles require high manufacturing technology and have configurations that are hard to form.

One example of the metallic powder is shown such as SCM 415. It can be carburization quenched later. It has a composition of C: 0.13% by weight, Ni: 0.21% by weight, Cr: 1.1% by weight, Cu: 0.04% by weight, Mn: 0.76% by weight, Mo: 0.19% by weight, Si: 0.20% by weight, and remainder: Fe. The sleeve 17 is formed by controlling temperature of carburization quenching and tempering. Other materials can be used for the sleeve 17. FEN 8, of Japanese Powder Metallurgy Industry Standard, is excellent in formability and rust resistance. It includes Ni: 3.0~10.0% by weight or precipitation hardening stainless steel SUS 630 including C: 0.07% by weight, Cr: 17% by weight, Ni: 4% by weight, Cu: 4% by weight, and remainder: Fe. The surface hardness of SUS 630 can be increased within a range of HRC 20~33 by solution treatment to obtain both high toughness and hardness.

As shown in FIG. 9, the sleeve 17, fit into the blind bore 12 of the second housing 2b, has a cup-shaped configuration. The sleeve 17 includes a cylindrical sleeve main body 31 and a bottom plate 32. The bottom plate 32 is fit into one end of the sleeve main body 31. The sleeve 17 is fit into the housing 2b until the bottom plate 32 is in close contact with the bottom of the blind bore 12. The axially extending recessed grooves 17a, 17a are formed by grinding the inner circumference of the sleeve main body 31 at diametrically opposite positions. Flat surfaces 35, 35 are formed on the outer circumference of the sleeve main body 31. The flat surfaces 35, 35 are arranged at positions circumferentially 90° apart from the recessed grooves 17a, 17a to assure the strength and rigidity of the sleeve 17. The two-piece structure simplifies the sleeve structure and improves its mass production.

As shown in FIG. 10, the bottom plate 32 of the sleeve 17 has an outline corresponding to the configuration of the sleeve main body 31. A pair of projections 32a, 32a is integrally formed on a side to be mounted onto the end face of the sleeve main body 31. The bottom plate 32 can be mounted on the sleeve main body 31 by fitting the projections 32a, 32a into the recessed grooves 17a, 17a.

The guide pin(s) 15 is formed of high carbon chrome bearing steel such as SW 2 or blister bearing steel such as SCr 435. Its surface is formed of a carbonitriding layer including carbon of 0.80% by weight or more. It has a hardness of HRC 58 or more. In this case it is possible to adopt needle rollers, used in needle bearings, as the guide pins. This provides the guide pin with a surface hardness of HRC 58 or more and is excellent in anti-wear property, availability and manufacturing cost.

As shown in FIG. 7, the blind bore 12 of the second housing 2b is formed with flat surfaces 36, 36 corresponding to the flat portions 35, 35 of the sleeve 17. Engagement of the flat surfaces 36, 36 and the flat portions 35, 35 prevent rotation of the sleeve 17 relative to the housing 2b. This simplifies the configuration of the sleeve 17, reduces its weight, manufacturing steps and costs. Also, it provides an electric linear actuator that can reduce damage and wear of the second housing 2b and has excellent durability, strength and reliability. Although it is described that paired flat portions of the sleeve 17 and paired flat surfaces of the housing 2b are formed on the two opposite surfaces, only one flat portion and flat surface may be formed respectively on the sleeve 17 and housing 2b.

The electric linear actuator of the present disclosure can be applied to electric linear actuators used in an electric motor for general industries and driving sections of an automobile etc. The electric linear actuator has a ball screw mechanism to convert the rotational input from an electric motor to linear motion of a drive shaft.

The present disclosure has been described with reference to the preferred embodiment. Obviously, modifications and alternations will occur to those of ordinary skill in the art upon reading and understanding the preceding detailed description. It is intended that the present disclosure be construed as including all such alternations and modifications insofar as they come within the scope of the appended claims or the equivalents thereof.

What is claimed is:

1. An electric linear actuator comprising:
a housing including an annular groove;
an electric motor mounted on the housing;
a speed reduction mechanism for reducing rotational speed of the electric motor via a motor shaft; and
a ball screw mechanism for converting rotational motion of the electric motor, transmitted via the speed reduction mechanism, to axial linear motion of a drive shaft; the ball screw mechanism comprising a nut and a screw shaft, the nut includes a helical screw groove on its inner circumference, the nut is rotationally supported by bearings mounted on the housing but is axially immovable with respect to the housing, the screw shaft is coaxially integrated with the drive shaft, the screw shaft includes a helical screw groove on its outer circumference corresponding to the helical screw groove of the nut, the screw shaft is inserted into the nut, via a desired number of balls, the screw shaft is axially movably supported on the housing, the screw shaft is non-rotatable with respect to the housing;
a sleeve is secured on the housing to prevent rotation of the screw shaft relative to the housing, at least one axially extending recessed groove is formed on the inner circumference of the sleeve;
at least one guide pin, mounted on the end of the screw shaft, engages the recessed groove;
a tapering chamfered portion is formed on an end of the nut to bring the nut and the sleeve close to each other while avoiding interference between the nut and sleeve and to prevent fall out of the at least one guide pin; and
a stopper ring is mounted in the annular groove to prevent falling out of the sleeve from the housing, and an inner diameter (Hs) of the stopper ring is larger than an entire height (Hp) of the guide pin.

2. The electric linear actuator of claim 1, wherein a distance between the nut and the sleeve is set so that a diameter of the chamfered portion is smaller than the radius of the guide pin.

3. The electric linear actuator of claim 1, wherein an outer diameter of the chamfered portion at an end is smaller than the inner diameter of the stopper ring.

4. The electric linear actuator of claim 1, wherein edges of the stopper ring are rounded to remove sharp edges.

* * * * *

UNITED STATES PATENT AND TRADEMARK OFFICE
CERTIFICATE OF CORRECTION

| | |
|---|---|
| PATENT NO. | : 9,476,489 B2 |
| APPLICATION NO. | : 14/698026 |
| DATED | : October 25, 2016 |
| INVENTOR(S) | : Kensuke Funada et al. |

It is certified that error appears in the above-identified patent and that said Letters Patent is hereby corrected as shown below:

In the Specification

Column 9
Line 53 "SW" should be --SUJ--.

Signed and Sealed this
Seventh Day of March, 2017

Michelle K. Lee
*Director of the United States Patent and Trademark Office*